Patented May 12, 1931

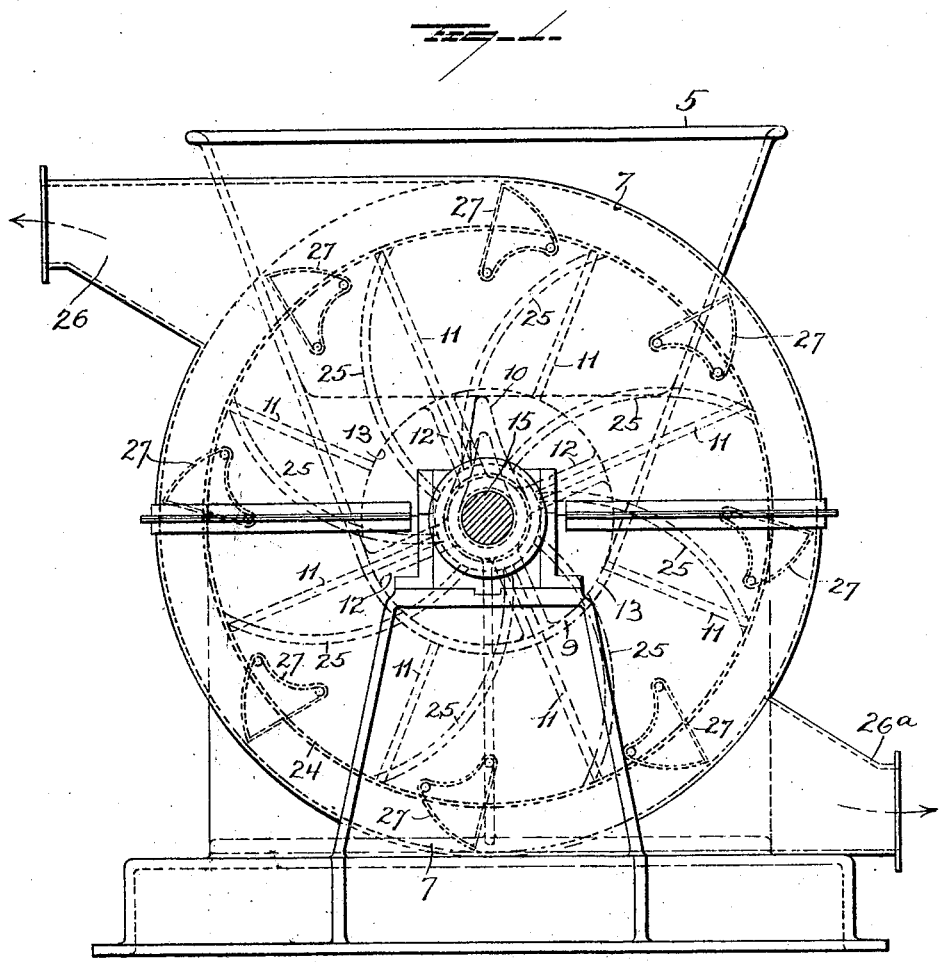

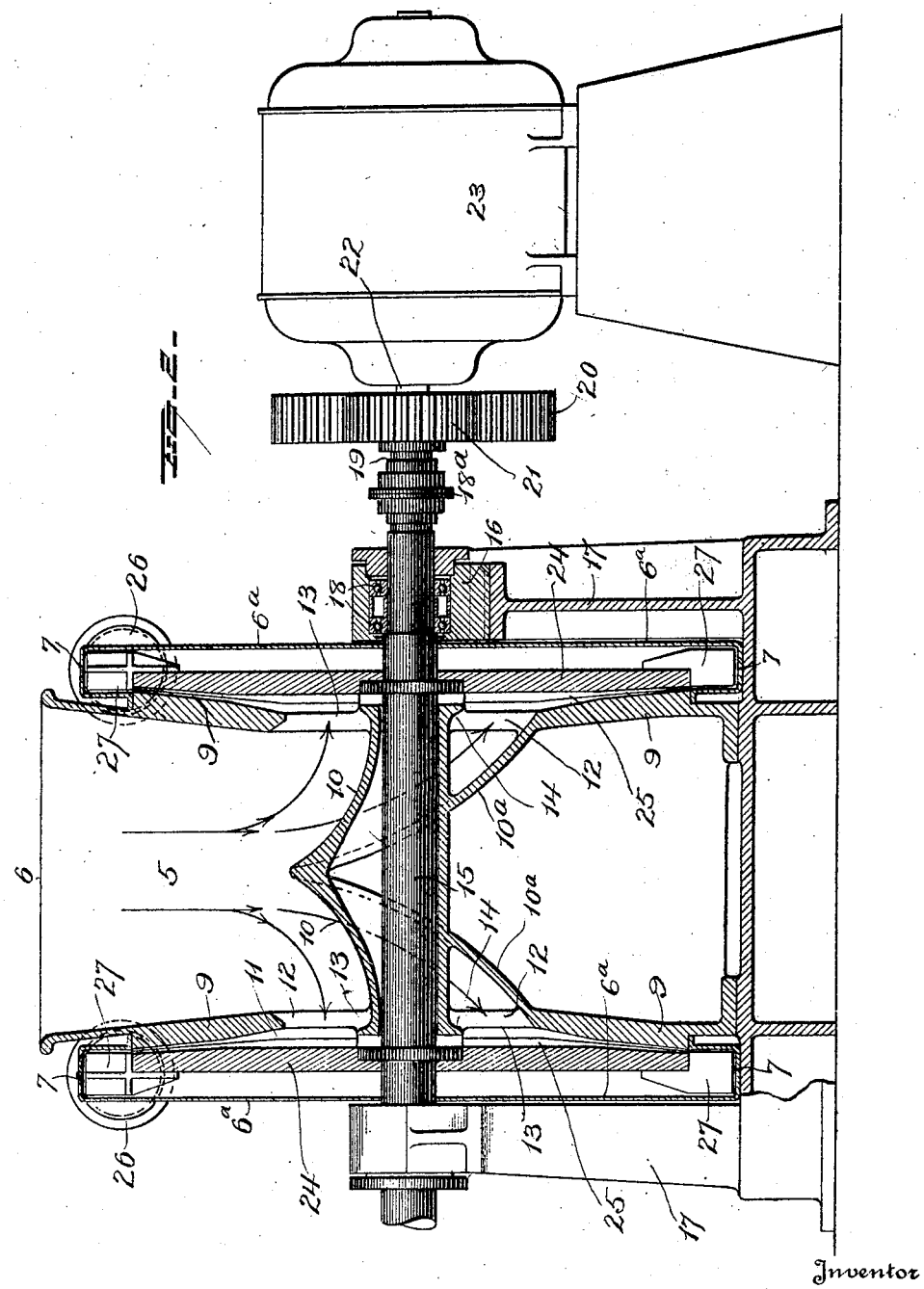

1,804,797

UNITED STATES PATENT OFFICE

WILLIAM HENRY MORGAN, OF ALLIANCE, OHIO, ASSIGNOR, BY MESNE ASSIGNMENTS, TO THE MORGAN HURRYCANE COMPANY, OF NEW YORK, N. Y., A CORPORATION OF FLORIDA

APPARATUS FOR DISINTEGRATING CANE STALKS PREPARATORY TO THE EXTRACTION OF THE JUICE FROM SAME

Application filed February 28, 1925, Serial No. 12,411. Renewed July 26, 1930.

The present invention relates to an apparatus for disintegrating sugar cane stalks in the preparation of the same for the extraction of the juice therefrom.

The principal object of the invention is to produce an improved apparatus by which sugar cane stalks may be efficiently reduced to a loose long-fibred mass from which the juice may be readily extracted.

With the above and other objects in view, the invention consists in an apparatus for disintegrating sugar cane embodying the novel and improved features hereinafter described and particularly pointed out in the claims.

The invention will be clearly understood from the accompanying drawings illustrating the invention in its preferred form and in the following detailed description of the constructions therein shown.

In the accompanying drawings; Figure 1 is a view in side elevation of my apparatus, and Figure 2 is a view in central transverse cross section, the shaft being shown in elevation.

The cane after or during the harvesting is cut into short lengths, and the cut or short length sections of the stalks are fed into the hopper 5 of the disintegrating apparatus. This apparatus may be located in the field, or in the mill as may be preferred, and if located in the mill the cane stalks are transported to the mill in the usual and well known manner. The stalks may be transported to the mill before cutting them into short lengths, and the cutting done at the mill, as my invention relates to the disintegration or shearing machine irrespective of where the cutting or shearing is done.

Turning now to the particular embodiment of my invention shown in the drawings, 6 is the side frame of the apparatus, the periphery of each of which is flanged or trough shaped as shown in Figure 2. The troughs 7 extend inwardly, or toward each other as shown, and are supported on the base or by the side frames. Also secured to the base 8 are two stationary disks 9, the upper parts of which are connected, as at 10 forming a hopper, the bottom of which is cone shaped as shown in Figure 2 at 10 and 10ª.

The inner face of these disks 9 are slightly beveled or inclined inwardly from their peripheries, and their outer faces are also slightly beveled in the same direction and are provided with slots or grooves to receive the knives or shredders 11 which are straight, as shown in dotted lines in Figure 1, and the knives or shredders 11 are wedge shaped from their outer ends inwardly part of their length, and rest in slots or grooves in the disks 9. These disks 9 are connected to or integral with the cones 10, 10ª by the spokes 12, which latter are cast integral with said cones and disks 9. This cone, or double cone, is shaped to deflect the cut stalks down to and through the openings 13 between the spokes 12, so that the cut stalks will pass into the space between the stationary and revolving disks. The double cone is so shaped that the outer edge or periphery of one cone or part of the double cone is in a plane above, while the other part is below so that the cut stalks have free egress from the hopper above and below the shaft 15.

The knives 11 extend along the spokes 12 as clearly illustrated on the drawings, so that the shearing action is begun even before the material has been carried radially away from the opening 13. This also assists in feeding the material between the disks in longitudinal relation to the shearing blades, that is, substantially radially of the disks, thus assuring the most efficient action of the disintegrators.

The shaft passes through the side frames or casing 6, and has its main support in bearings 16 secured to the upper ends of the castings 17, which are formed integral with the base 8, as shown in Figure 2. Each bearing box 16 carries roller bearings 18 for the shaft 15, and the latter is coupled, by any suitable coupling 18ª with the shaft 19 carrying the large gear 20, which is driven through the smaller gear 21 on the armature shaft 22 by a motor 23.

There may, if desired, be a drive motor connected by gearing with the other end of shaft 15, the two motors being connected electrically to operate in unison, in which event smaller motors could be used, than would be possible if the power were applied to one end of the shaft only. If preferred the motors may be independent of each other, so that in the event of a break down or defect in one of the motors the other could be used, thus providing for the continuous operation of the apparatus.

Secured to the shaft 15 intermediate the frame 6 and the stationary disks 9, are the rotating disks 24 rigidly secured to the main shaft. These disks have their inner faces slightly inclined near their peripheries. These inner faces are provided with curved grooves, shown in dotted lines in Figure 1, in which the knives or shear blades 25 are seated. The knives or shredders are also tapered or wedge-shaped, part way from their outer edges or peripheries, and have their thinner ends adjacent the outer edges of the disks, so that when the disks with the knives therein are assembled the adjacent faces of the knives on the moving disks 24 will be parallel with or approximately so, and but slightly separated from those on the stationary disks 9.

The knives may be adjusted in their grooves to compensate for wear by inserting shims under the knives. The knives may be formed with an acute cutting edge, as by bevelling the other edge or they may have rectangular cutting edges.

In the operation of the apparatus, the cut stalks, or other similar material, is dumped or fed into the hopper 5 and gravitates to the side openings 13, the weight of the material above assisting materially in forcing the cane or other sugar producing material through the openings 13 and into contact with the knives or shredders 11 and 25, the former of which are stationary and the latter rotate with shaft 15 as above explained. The rotating disks revolve rapidly, and the cane or other material coming in contact with the knives on the revolving disks will be carried or dragged and thrown by centrifugal force between the disks and the shears carried thereby and be disintegrated into a fibrous mass, and thus be put in a condition to be readily passed between juice extracting rolls without any further crushing.

The knives or cutters on the revolving disks being curved or scimitar shape, add to the progress of the material from the centers of the disks out toward the periphery where it is thrown or falls into the trough 7. These knives cooperating with the stationary knives 11 on the spokes 12 also assist in feeding the pieces of cane in longitudinal relation to the knives on the disks. Assuming, for example, that a piece of cane is caught endwise between one of the knives 11 and the upper part of one of the curved knives 25, the draw-cut action of the cooperating knives will also tend to crowd the end of the piece of cane radially outward and between the disks so that the cane will be fed in radial relation thereto and will be subjected to the desirable rolling and cutting action which is a characteristic feature of my new apparatus.

This trough 7 extends wholly around the outer edges of the side frames, and communicate at both sides at the top, as shown at 26, or at the bottom as at 26$^a$, with discharge openings which are connected by pipes or conveyors leading to the crushing rolls. In the drawings I have shown discharge openings for the disintegrated mass located at the top and bottom, but it is evident that they may be located either at the top, or the bottom or both as found most convenient and efficient.

Secured to the rotating disks 24 are a series of paddles or fan blades 27, which are of substantially the size as the cross sectional area of the trough 7, and operate to create a blast of air which causes the disintegrated material to be ejected through the discharge openings 26—26$^a$, and as these paddles or fan blades are substantially as wide and deep as the trough, they also operate to prevent the disintegrated material sticking to the inside of the trough, but keep it in motion until discharged by the air blast through the discharge openings. I have illustrated in the drawing and described above one embodiment of my invention which I now believe to be most advantageous.

It is evident, however, that many changes might be resorted to in the relative arrangement of parts shown and described without departing from the spirit and scope of my invention hence I would have it understood that I do not wish to confine myself to the exact construction and arrangement of parts shown and described. Thus, for example, the exact positioning and shape of the knives shown in the drawing, while advantageous, is not essential to the practice of my invention. Similarly, parts which are described above as integral, may be made separately and secured together. The shape of the faces of the disks may be varied somewhat and the knives may be mounted on such faces in other ways than those described above. Other changes which do not depart from the spirit or scope of my invention will be obvious to those skilled in the art.

Having fully described my invention what I claim as new and desire to secure by Letters-Patent, is:—

1. In a disintegrator for sugar producing material, the combination of two stationary disks, shearing knives mounted on the inner faces of said disks, a hopper formed between the upper portions of said disks, the said disks being provided with openings communicating with the hopper adjacent the centers of the disks, the bottom of the hopper being cone-shaped and extending below said openings, a rotary shaft passing through said disks, and non-adjustable disks secured to said shaft and provided on their inner faces with shearing knives which co-act with the knives on the stationary disks.

2. In a disintegrator for sugar cane, the combination of two separated disks, a hopper between them, radial shearing knives on the outer faces of said disks, a shaft passing through said disks and hopper, disks secured to said shaft and provided on their inner faces with knives or cutters which co-act with the knives on the stationary disks, the said cutters on the rotary disks being curved to secure a drawcut action.

3. In a disintegrator for sugar cane, the combination of two fixed disks having knives or cutters on their outer faces, a hopper between the disks and common to both, the hopper having exit openings for the cane, a shaft mounted to revolve and passing through said disks, disks secured to the shaft and provided on their inner faces with knives co-acting with the knives or cutters on the stationary disks to secure a draw-cut action, a casing having a peripheral trough for each pair of disks, and discharge openings from said troughs.

4. In a disintegrator for sugar cane or other material, the combination with two fixed disks having cane shearing means on their outer faces, each disk having an opening through the same, a hopper intermediate between said disks and discharging through the openings in the latter, a rotary shaft passing through the disks, two disks fixed to said shaft and having shearing means on their inner faces adapted to cooperate with the shearing means on the fixed disks to secure a draw cutting action, a trough embracing each pair of disks and adapted to receive the shearing material, a series of fan blades secured to the revolving disks and moving in the troughs, and a discharge outlet for each trough.

5. In a disintegrator for sugar cane or other material, the combination of two fixed disks each having an opening therein and provided with shearing means on its outer face, a hopper intermediate between the disks and discharging into said openings, a revolving shaft, two disks fixed on said shaft each having shearing means cooperating with the shearing means on the fixed disks, a trough embracing the peripheries of each set of disks and arranged to receive the sheared material, fan blades or paddles on the movable disks extending into the respective troughs, the said fan blades or paddles being approximately as wide and deep as the corresponding trough, and a discharge opening for each trough.

6. In a disintegrator for sugar producing material, the combination of two stationary disks each having a central feed opening and shearing means extending radially from said feed openings, a rotary shaft passing centrally through said stationary disks, rotary disks fixed to said shaft shearing means carried by said rotary disks which coact respectively with said shearing means carried by said stationary disks, and a hopper between said stationary disks and having directing means for simultaneously feeding the material in both sets of shearing disks.

7. In a disintegrator for sugar producing material, the combination of two stationary disks each having a central feed opening, and shearing means extending radially from the feed openings, a hopper intermediate between said disks and provided with an inclined bottom shaped to feed the material to the feed openings, a rotary shaft passing centrally through said disks, rotary disks fixed to said shaft and shearing means carried by said rotary disks and arranged to cooperate respectively with the shearing means on said fixed disks.

8. In a disintegrator for sugar cane, the combination of inner fixed discs each having a feed opening, a hopper between said discs from which the cane is fed simultaneously through said openings, outer rotary discs respectively spaced from the fixed discs to form cane confining spaces, and shearing devices carried respectively by each fixed disc and by the co-operating rotary discs for shearing the cane into a hay-like fibrous mass.

9. In a disintegrator for sugar cane, the combination of inner fixed discs, a hopper between said discs, outer rotary discs respectively spaced from the fixed discs to form cane confining spaces, shearing devices carried respectively by each fixed disc and by the co-operating rotary discs, at least a portion of said shearing devices being positioned at an angle to the shearing devices carried by the opposite disc for shredding the cane into a hay-like fibrous mass.

10. In a disintegrator for sugar cane, the combination of inner fixed discs, a hopper between said discs, outer rotary discs respectively spaced from the fixed discs to form a cane confining space, shearing devices carried respectively by each fixed disc and by the co-operating rotary discs, the shearing devices carried by said rotary disc being curved so as to produce a draw cutting action upon the cane and to assist in expelling the cut cane from the cane confining space.

11. In a disintegrator for sugar cane, the combination of inner fixed discs, each formed with a feed opening, a hopper between said discs from which the cane is fed simultaneously through said openings, outer rotary discs, each spaced from one of the fixed discs to form a cane confining space communicating with the feed opening in said fixed disc, shearing devices carried respectively by each fixed disc and by the co-operating rotary disc for shearing the cane into a hay-like fibrous mass, and peripheral troughs communicating with the spaces between said discs for receiving the disintegrated material.

12. In a disintegrator for sugar cane, the combination of inner fixed discs, each formed with a feed opening, a hopper between said discs from which the cane is fed simultaneously through said openings, outer rotary discs each spaced from one of the fixed discs to form a cane confining space communicating with the feed opening in said fixed disc, shearing devices carried respectively by each fixed disc and by the co-operating rotary disc for shearing the cane into a hay-like fibrous mass, peripheral troughs communicating with the spaces between said discs for receiving the disintegrated material, and fan blades rotatably mounted to operate in each of said troughs for propelling the material therethrough and for creating air currents in the spaces between said discs from the central toward the outer portion thereof.

In testimony whereof, I have signed this specification.

WILLIAM HENRY MORGAN.